United States Patent
Fukuda et al.

(10) Patent No.: US 8,992,197 B2
(45) Date of Patent: Mar. 31, 2015

(54) TIRE VULCANIZER AND MAINTENANCE METHOD OF TIRE VULCANIZER

(71) Applicant: Mitsubishi Heavy Industries Machinery Technology Corporation, Hiroshima-shi, Hiroshima (JP)

(72) Inventors: Hideki Fukuda, Tokyo (JP); Mitsuru Morita, Hiroshima (JP); Yukihisa Harada, Hiroshima (JP)

(73) Assignee: Mitsubishi Heavy Industries Machinery Technology Corporation, Hiroshima-Shi, Hiroshima (JP)

( * ) Notice: Subject to any disclaimer, the term of this patent is extended or adjusted under 35 U.S.C. 154(b) by 0 days.

(21) Appl. No.: 14/373,546

(22) PCT Filed: Jun. 24, 2013

(86) PCT No.: PCT/JP2013/067193
§ 371 (c)(1),
(2) Date: Jul. 21, 2014

(87) PCT Pub. No.: WO2014/069040
PCT Pub. Date: May 8, 2014

(65) Prior Publication Data
US 2014/0363531 A1    Dec. 11, 2014

(30) Foreign Application Priority Data

Nov. 5, 2012    (JP) .................................. 2012-243996

(51) Int. Cl.
*B29D 30/06*    (2006.01)

(52) U.S. Cl.
CPC ........ *B29D 30/0645* (2013.01); *B29D 30/0662* (2013.01); *B29D 2030/0663* (2013.01)
USPC ............................. 425/48; 29/426.1; 425/58

(58) Field of Classification Search
CPC ..................... B29D 30/0645; B29D 2030/0646
USPC ...................... 425/48, 58, 182, 193; 29/426.1
See application file for complete search history.

(56) References Cited

U.S. PATENT DOCUMENTS 5,106,280 A * 4/1992 Sakaguchi ...................... 425/48
5,149,545 A * 9/1992 Sakaguchi et al. .............. 425/49
(Continued)

FOREIGN PATENT DOCUMENTS

| JP | S62-18217 A | 1/1987 |
| JP | H10-156833 A | 6/1998 |

(Continued)

OTHER PUBLICATIONS

PCT/ISA/210, "International Search Report for PCT/JP2013/067193", Sep. 24, 2013.

(Continued)

*Primary Examiner* — James Mackey
(74) *Attorney, Agent, or Firm* — Benjamin Hauptman; Manabu Kanesaka; Kenneth Berner (57) ABSTRACT

A tire vulcanizer includes: a support structure (13) which includes a platen portion (14); a guide member (31) which includes a flanged portion (33) in an end portion thereof so as to cause the flanged portion (33) to be detachably supported by a peripheral edge portion of a through-hole (25) formed in the platen portion (14); and a bag head (37) which is slidably inserted into the guide member (31). The bag head (37) includes a restriction member (70) which abuts on the guide member (31) and restricts displacement of the bag head (37) in an insertion direction in a case where the bag head (37) is inserted to a predetermined position set in advance with respect to the guide member (31). The restriction monitor (70) is detachable mounted on an outer peripheral surface of the bag head (37) to protrude outward from the outer peripheral surface.

5 Claims, 9 Drawing Sheets

(56) References Cited

U.S. PATENT DOCUMENTS 7,513,763 B1 * 4/2009 Singh et al. ............... 425/48
8,133,046 B2 * 3/2012 Tomoto et al. ............ 425/48

FOREIGN PATENT DOCUMENTS

| JP | H11-042645 A | 2/1999 |
| JP | 2002-120228 A | 4/2002 |
| JP | 2009-132101 A | 6/2009 |
| JP | 2010-241090 A | 10/2010 |

OTHER PUBLICATIONS

PCT/ISA/237, "Written Opinion of the International Searching Authority for PCT/JP2013/067193", Sep. 24, 2013.

* cited by examiner

TIRE VULCANIZER AND MAINTENANCE METHOD OF TIRE VULCANIZER

RELATED APPLICATIONS

The present application is National Phase of International Application No. PCT/JP2013/067193 filed Jun. 24, 2013, which claims priority from Japanese Application No. 2012-243996, filed Nov. 5, 2012.

TECHNICAL FIELD

The present invention relates to a tire vulcanizer and a maintenance method of the tire vulcanizer.

Priority is claimed on Japanese Patent Application No. 2012-243996, filed on Nov. 5, 2012, the content of which is incorporated herein by reference.

BACKGROUND ART

In a tire vulcanizer which performs a vulcanization process of a tire in a high-pressure and high-temperature state, generally, a bag-shaped bladder which presses the tire accommodated in a mold from the inside is provided. There may be cases where the bladder is mounted on a center mechanism provided at the center portion of a support structure which supports a lower mold. A fluid as a vulcanizing medium such as steam, hot water, or gas such as nitrogen can be supplied into and discharged from the bladder via a supply and discharge passage formed in the center mechanism. When the tire is pressed, the bladder is allowed to inflate by the vulcanizing medium (for example, see PTLs 1 to 3).

Figure 11:
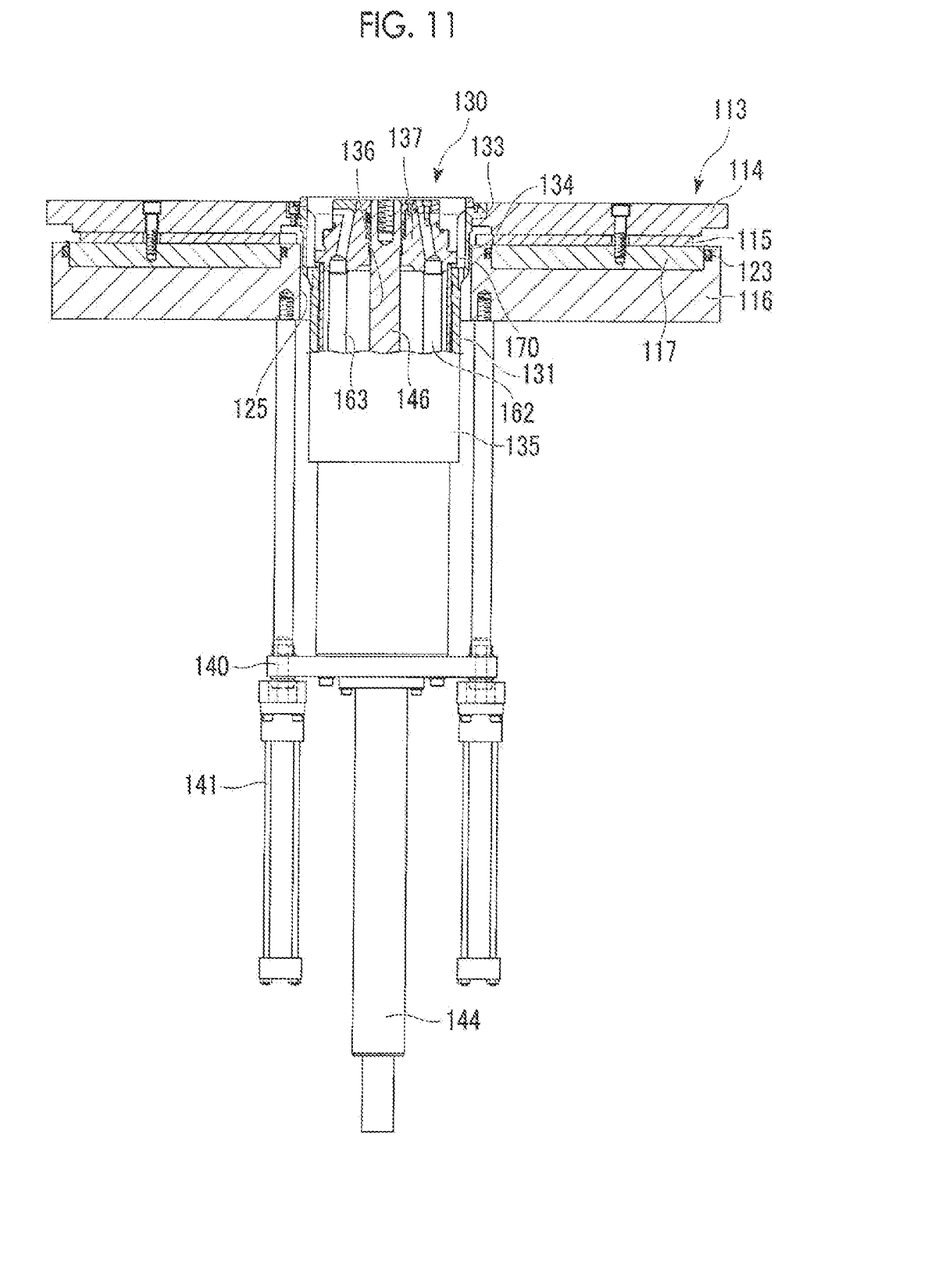
FIG. 11 is a partial cross-sectional view a center mechanism of a general tire vulcanizer corresponding to FIG. 1.

As illustrated in FIG. 11, the center mechanism 130 includes a guide member 131, a bag head 137, and a center post 146. The guide member 131 is mounted in a through-hole 125 which is formed at the center of a support structure 113. The bag head 137 is elevated along the guide member 131. The center post 146 is elevated in a guide hole 136 which is formed at the center portion of the bag head 137. An upper clamp ring (not illustrated) which grips the upper portion of the bladder (not illustrated) is mounted on the upper end portion of the center post 146. A lower clamp ring (not illustrated) which grips the lower portion of the bladder is mounted on the bag head 137.

The center post 146 forms the piston rod of a center post cylinder 144 which is disposed below the bag head 137. Otherwise, the center post 146 is connected to the tip end portion of the piston rod of the center post cylinder 144 by a screw or the like and slides along with the piston rod. A bead lift cylinder 141 is mounted on the center post cylinder 144 via a bracket 140.

For example, as the center post cylinder 144 is extended, the upper end portion of the center post 146 protrudes upward from the bag head 137, and the outside diameter of the bladder decreases. Accordingly, the bladder can be inserted into the inside from the bead of the tire, or the bladder can be separated from the inner peripheral surface of the tire.

In a case where the bead lift cylinder 141 is extended, the bag head 137 is displaced upward together with the center post 146, and the bead portion of the vulcanized tire which is accommodated in a mold (not illustrated) is pressed upward to be released from the mold.

The support structure 113 that supports the mold from below includes, for example, a lower platen 114, a support plate 116, and a heat insulating material 115. The lower platen 114 is a hot plate which heats the mold. The support plate 116 supports the lower platen 114 from below. The heat insulating material 115 is provided between the lower platen 114 and the support plate 116, and blocks heat of the lower platen 114.

In the support plate 116 of the support structure 113 illustrated in FIG. 11, a piston 117 which is operated by a fluid such as air, nitrogen gas, water, or oil is provided. The mold which is displaced in an opening direction due to an increase in the internal pressure or the like can be pressed by the piston 117 in a closing direction.

The upper end portion of the guide member 131 included in the center mechanism 130 described above includes a flanged portion 133 which extends outward in a radial direction. The flanged portion 133 is fixed to the peripheral edge portion of the through-hole of the lower platen 114 from above by a bolt or the like. Accordingly, the guide member 131 is fixed to the support structure 113. The guide member 131 includes a small diameter portion 135 of which the inside diameter is slightly larger than the outside diameter of an inner cylinder that extends downward from the bag head 137, and a large diameter portion 134 which has a larger inside diameter than that of the small diameter portion 135 and of which the upper edge is provided with the flanged portion 133. A restriction portion 170 is formed in the outer peripheral surface of the upper portion of the bag head 137.

The restriction portion 170 is disposed at a position where the end portion thereof on the outside in the radial direction is closer to the outside in the radial direction than the inner peripheral surface of the small diameter portion 135 of the guide member 131 and is closer to the inside in the radial direction than the inner peripheral surface of the large diameter portion 134. Accordingly, in a case where the bag head 137 slides toward the small diameter portion 135 of the guide member 131 and is located at a predetermined elevated position, the restriction portion 170 of the bag head 137 collides with a stepped portion between the small diameter portion 135 and the large diameter portion 134 of the guide member 131. As a result, the displacement of the bag head 137 toward the small diameter portion 135 is restricted.

CITATION LIST

Patent Literature

[PTL 1] Japanese Unexamined Patent Application Publication No. 10-136833
[PTL 2] Japanese Unexamined Patent Application Publication No. 11-042645
[PTL 3] Japanese Unexamined Patent Application Publication No. 2010-241090

SUMMARY OF INVENTION

Technical Problem

There may be a case where the lower platen 114 of the support structure 113 and the like in the above-described tire vulcanizer needs to be detached due to maintenance and the like. Particularly, in a case where a pressing mechanism such as the piston 117 which presses the mold upward is provided, there is a possibility that an exchange frequency of a sealing material 123 which seals the inner and outer peripheral portions of the piston 117 may be increased. This is caused by the influence of heat from the lower platen 114 or by the piston 117 that slides in the vertical direction while the fluid is sealed in the support plate 116, the piston 117, and the sealing material 123.

However, in a case of detaching the components of the support structure 113, first, a plurality of pipes and wires which are connected to the center post cylinder 144, the bead lift cylinder 141, and the like or a plurality of pipes which are connected to supply and discharge passages 162 and 163 of the bag head 137 and the like are detached. Subsequently, the bag head 137, the guide member 131, the center post cylinder 144, the bead lift cylinder 141, and the like are integrally raised as a single assembly, and are extracted from the through-hole 125. Thereafter, the lower platen 114 is detached.

There may be a case where the weight of the assembly reaches hundreds of kilograms to several tons or higher. Therefore, there is a need to perform an operation by carefully lifting the assembly using a crane or the like, and thus there is a problem in that the burden on a worker who manages the maintenance operation is very heavy.

The present invention provides a tire vulcanizer capable of reducing the burden on a worker by easily allowing maintenance of a support structure disposed in the periphery of a center mechanism, and a maintenance method of the tire vulcanizer.

Solution to Problem

According to a first aspect of the present invention, a tire vulcanizer includes a support structure which supports a mold for vulcanization and molding and includes a platen portion provided with a through-hole that communicates with an inner portion of the mold. In addition, the tire vulcanizer further includes a guide member which includes a flanged portion in an end portion thereof so as to cause the flanged portion to be detachably supported by a peripheral edge portion of the through-hole, and a bag head which is slidably inserted into the guide member. The bag head includes a restriction member which abuts on the guide member and restricts displacement of the bag head in an insertion direction in a case where the bag head is inserted to a predetermined position set in advance with respect to the guide member. The restriction member protrudes outward from an outer peripheral surface of the bag head and is detachably mounted on the outer peripheral surface.

According to a second aspect of the present invention, the restriction member in the tire vulcanizer of the first aspect may be formed in an annular shape which extends over an entire periphery of the guide member.

According to a third aspect of the present invention, in the tire vulcanizer of the second aspect, a groove may be formed in the bag head in a circumferential direction, the restriction member may be formed to be divided in the circumferential direction of the bag head, and an inner peripheral portion of the restriction member may be disposed in the groove.

According to a fourth aspect of the present invention, in the tire vulcanizer of any one of the first to third aspects, the support structure may include a plate portion which supports the platen portion, and the plate portion may include a pressing mechanism which is able to press the platen portion.

According to a fifth aspect of the present invention, a maintenance method of the tire vulcanizer of any one of the first to fourth aspects, includes a protruding process of causing the bag head to protrude from the guide member. In addition, the maintenance method further includes a restriction releasing process of detaching the restriction member from the bag head. In addition, the maintenance method further includes a guide disassembly process of detaching the flanged portion of the guide member from the support structure, and separating the guide member from the bag head by causing the guide member to slide toward an end portion of the bag head. In addition, the maintenance method further includes a platen disassembly process of detaching the platen portion.

Advantageous Effects of Invention

According to the tire vulcanizer and the maintenance method of the tire vulcanizer, maintenance of the support structure disposed in the periphery of the center mechanism can be easily performed and thus burden on a worker van be reduced.

DESCRIPTION OF EMBODIMENTS

Hereinafter, an exemplary embodiment of the present invention will be described with reference to the drawings.

Figure 1:
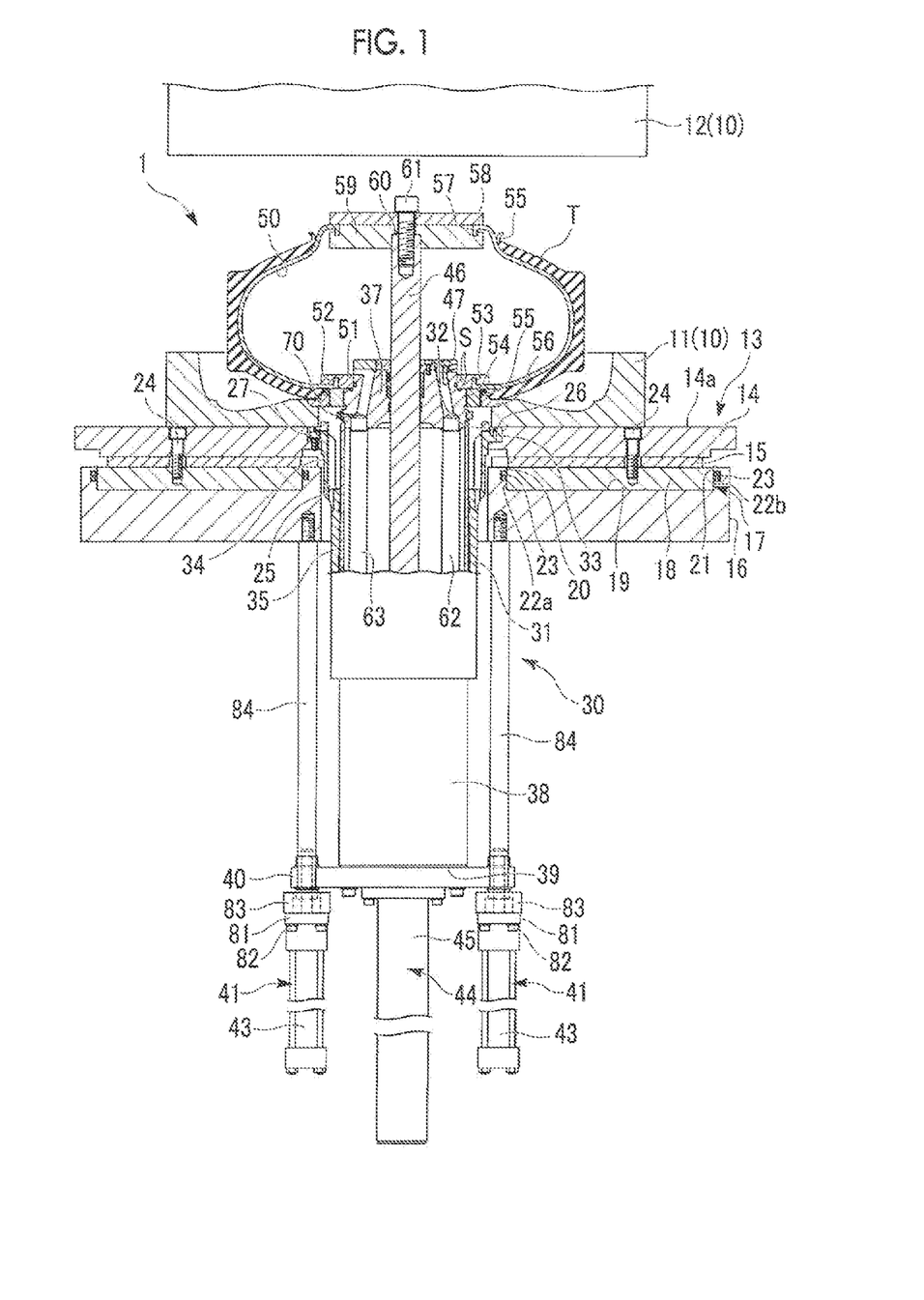
FIG. 1 is a partial cross-sectional view of a center mechanism of a tire vulcanizer according to an embodiment of the present invention.

FIG. 1 is a partial cross-sectional view illustrating a center mechanism of a tire vulcanizer of this embodiment.

As illustrated in FIG. 1, a tire vulcanizer 1 is an apparatus which performs a vulcanization process of applying heat and pressure to an unvulcanized green tire T to cause a chemical reaction, and includes a mold 10 which is divided into a lower mold 11 and an upper mold 12 for vulcanizing and molding the green tire T. The upper mold 12 is supported by an elevating mechanism (not illustrated) to approach and be separated from the lower mold 11 in the vertical direction. The lower mold 11 is disposed to come into contact with a lower platen (platen portion) 14 of a support structure 13 which supports the mold 10 from below.

The lower platen 14 is a hot plate of which the temperature can be increased by a heat source (not illustrated), and can simultaneously heat and support the lower mold 11 from below. A heat insulating material 15 which blocks heat of the lower platen 14 so as not to be transmitted downward, and a bottom plate portion 16 which supports the lower platen 14 and the heat insulating material 15 from below is arranged below the lower platen 14. The upper portion of the bottom plate portion 16 is provided with a pressing mechanism 17 which can press the lower mold 11 by elevating the lower platen 14.

The pressing mechanism 17 includes a piston portion 18 having an annular plate shape, and an annular groove portion 19 which forms a cylinder chamber into which the piston portion 18 is inserted. Sealing members 23 such as O-rings are mounted on an inner periphery inner wall 20 and an outer periphery inner wall 21 of the annular groove portion 19 so that a working fluid does not leak from between an inner peripheral surface 22a and an outer peripheral surface 22b of the piston portion 18 and between the inner periphery inner wall 20 and the outer periphery inner wall 21 of the annular groove portion 19. A supply and discharge passage (not illustrated) for supplying and discharging the working fluid to and from the pressing mechanism 17 is formed in the bottom plate portion 16, and the lower platen 14 and the piston portion 18 are integrated by bolts 24 with the heat insulating material 15 interposed therebetween. The bottom plate portion 16 is fixed to an apparatus frame (not illustrated).

The support structure 13 is provided with a through-hole 25 which communicates with the inside of the mold 10. A center mechanism 30 is mounted in the through-hole 25.

Figure 2:
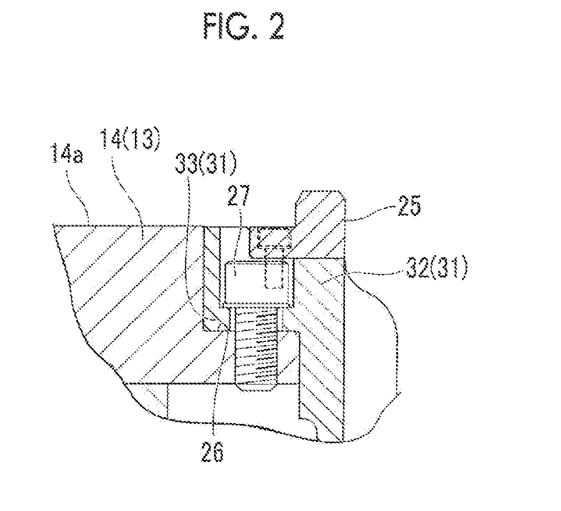
FIG. 2 is an enlarged cross-sectional view of a flanged portion of a guide member of the center mechanism.

The center mechanism 30 includes a substantially cylindrical guide member 31 which extends vertically. The end portion, more specifically, an upper end portion 32 of the guide member 31 includes a flanged portion 33 which extends in the radial direction. Here, as illustrated in FIGS. 1 and 2, a stepped portion 26 is formed in the peripheral edge of the through-hole 25 on an upper surface 14a side of the lower platen 14 described above. The flanged portion 33 is fitted in the stepped portion 26 of the lower platen 14, and is detachably fastened to the lower platen 14 by a bolt 27.

The guide member 31 includes a large diameter portion 34 in which the flanged portion 33 is formed, and a small diameter portion 35 which is formed below the large diameter portion 34 to have a slightly smaller diameter. The guide member 31 is mounted to extend downward from the support structure 13 in the vertical direction.

An inner cylinder 38 is slidably inserted into the guide member 31. The inner cylinder 38 is formed in a substantially cylindrical shape in which the outside diameter thereof is slightly smaller than the inside diameter of the small diameter portion 35 described above. A substantially columnar tag head 37 is integrally mounted on the inner cylinder 38 so that the axis thereof is aligned with the axis of the inner cylinder 38. A bracket 40 which extends toward both outer sides of the inner cylinder 38 in the radial direction is mounted on a lower end surface 39 of the inner cylinder 38. Bead lift cylinders 41 are mounted at symmetrical positions on the outside of the inner cylinder 38, via the bracket 40.

Figure 5:
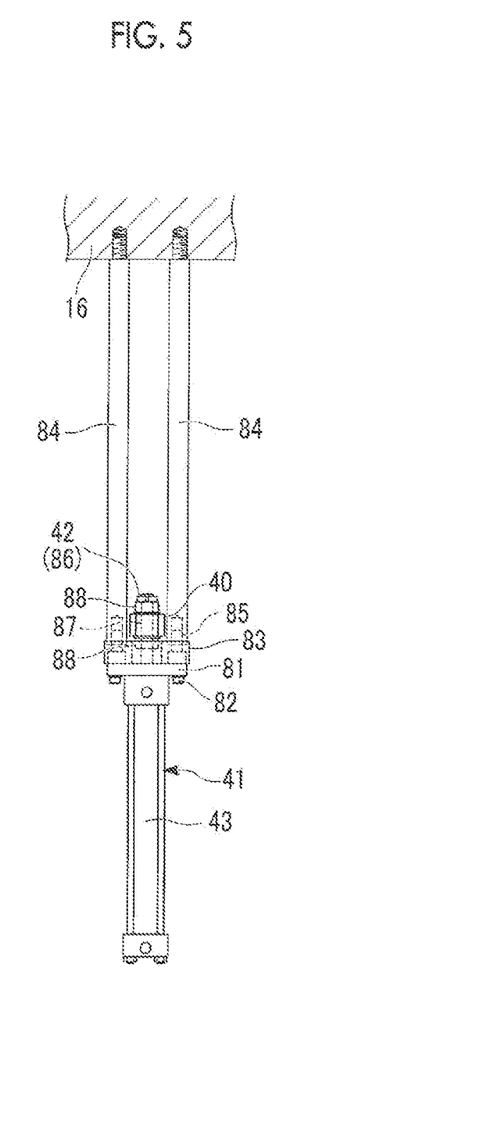
FIG. 5 is a front view of a bead lift cylinder of the tire vulcanizer.

As illustrated in FIGS. 1 and 5, the bead lift cylinder 41 includes a rod portion 42 and a cylinder portion 43. The bead lift cylinder 41 includes a rod flange 81 which is provided in the upper portion of the cylinder portion 43. The rod flange 81 is fixed to a plate 83 which is disposed thereabove via a plurality of fastening components 82. The lower ends of a plurality of rods 84 are fixed to the plate 83 via fastening components 85. The upper ends of the rods 84 are screwed to the bottom plate portion 16 so as to be fixed to the bottom plate portion 16.

A screw 86 is provided in the upper end portion of the rod portion 42. The screw 86 formed in the rod portion 42 is inserted into a through-hole 87 formed in the bracket 40. Nuts 88 are mounted on the screw 86 to vertically interpose the bracket 40 therebetween. By tightening the nuts 88, the bracket 40 and the rod portion 42 of the bead lift cylinder 41 are fixed to each other. That is, as the bead lift cylinder 41 is driven in the extending direction, the inner cylinder 38 of the bag head 37 slides upward along the guide member 31. In addition, as the bead lift cylinder 41 is driven in the retracting direction, the inner cylinder 38 of the bag head 37 slides downward along the guide member 31.

As illustrated in FIG. 1, a center post cylinder 44 is mounted on the lower portion of the inner cylinder 38. The center post cylinder 44 includes a cylinder portion 45 and a center post portion 46, and the upper portion of the cylinder portion 45 is fixed to the lower portion of the inner cylinder 38 via the bracket 40. The center post portion 46 forms the piston rod of the center pest cylinder 44. Otherwise, the center post portion 46 is connected to the tip end portion of the piston rod (not illustrated) of the center post cylinder 44 by a screw or the like, and penetrates through the bag head 37 to be vertically slidable. The length of the center post portion 46 which protrudes upward can be changed by extending or retracting the center post cylinder 44.

A bladder 50 for pressing the green tire T against the mold 10 from the inside during vulcanization and molding is mounted on the upper portion of the bag head 37. More specifically, a substantially annular clamp ring 53 is engaged with a peripheral edge portion 52 of a lower opening 51 of the bladder 50. The clamp ring 53 is screwed to a male screw portion 54 which is provided in the upper outer peripheral surface of the bag head 37 such that the peripheral edge portion 52 of the lower opening 51 of the bladder 50 is mounted on the bag head 37. A lower bead ring 56 which supports a bead portion 55 of the green tire T from below is mounted on the outside of the clamp ring 53 in the circumferential direction. The clamp ring 53 and the lower bead ring 56 are elevated along with the bag head 37. A sealing member S is mounted between the clamp ting 53 and the bag head 37 so that the fluid does not leak to the outside.

A substantially disk-shaped clamp ring 59 is engaged with a peripheral edge portion 58 of an upper opening 57 of the bladder 50, and the clamp ring 59 is mounted on an upper end portion 60 of the center post portion 46 via a bolt 61.

In the upper portion of the bag head 37, a nestle 47, to which a supply passage 62 far supplying a fluid as a vulcanizing medium such as steam, hot water, or nitrogen gas into the bladder 50, and a discharge passage 63 for discharging the fluid supplied into the bladder 50 are connected, is mounted. An external pipe (not illustrated) for supplying and discharging the fluid is connected to each of the supply passage 62 and the discharge passage 63.

In a case where the amount of the center post portion 46 protruding from the bag head 37 is increased, the bladder 50 can be separated from the green tire T. The protruding amount of the bag head 37 is reduced to be equal to the width of the tire in the axial direction and the fluid is supplied into the bladder 50 to increase the internal pressure such that the bladder 50 can come into close contact with the inner surface of the green tire T to be pressed. Furthermore, in a case where the bag head 37 is caused to slide upward to be displaced, the bead portion 55 of the vulcanized tire is pressed upward by the lower bead ring 56, and thus the vulcanized tire can be separated from the lower mold 11.

Figure 3:
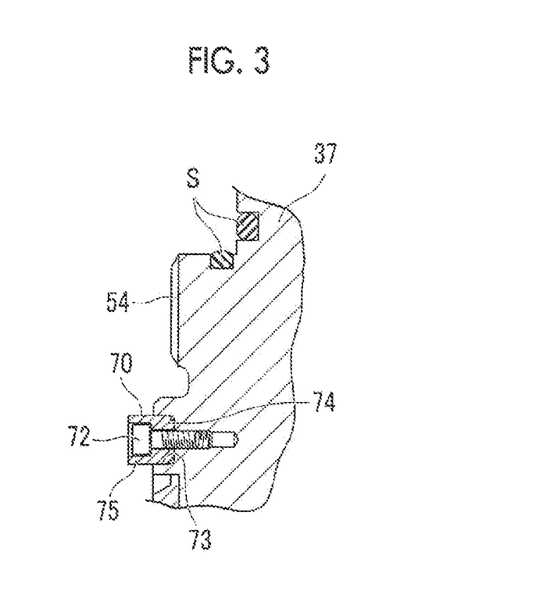
FIG. 3 is an enlarged cross-sectional view of a restriction member of the center mechanism.
Figure 4:
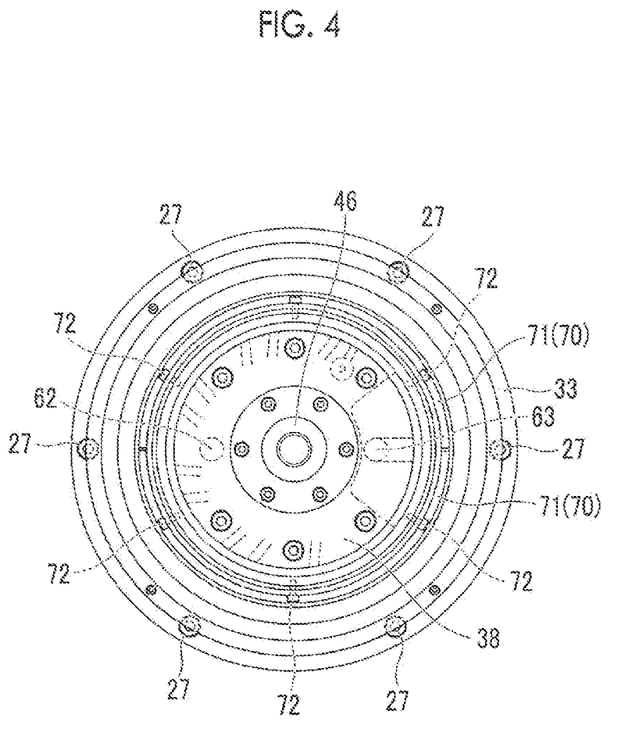
FIG. 4 is a plan view of the center mechanism.

As illustrated in FIGS. 1, 3, and 4, a restriction member 70 is detachably mounted on the bag head 37 by a plurality of bolts 72. In a case where the bag head 37 is inserted to a predetermined elevated position which is set in advance with respect to the guide member 31, the restriction member 70 abuts on the guide member 31 to restrict the displacement of the bag head 37 in the insertion direction.

The restriction member 70 is divided into a plurality of, more specifically, two divided pieces 71 in the circumferential direction of the guide member 31. On the other hand, an annular groove 73 in which the restriction member 70 is mounted is formed in the outer peripheral surface of the inner cylinder 38 of the bag head 37 over the entire periphery in the circumferential direction. An inside portion (inner peripheral portion) 74 of the divided piece 71 on the inside in the radial direction is fitted into the annular groove 73, and an outside diameter portion 75 thereof on the outside in the radial direction protrudes outward in the radial direction from the outer peripheral surface of the bag head 37. The divided piece 71 has a substantially annular shape which extends over the entire periphery of the bag head 37 in the circumferential direction in a state of being mounted on the bag head 37. The outside diameter of the divided piece 71 having a substantially annular shape is larger than the inside diameter of the small diameter portion 35 of the guide member 31. That is, when the bag head 37 is displaced to the predetermined elevated position in the insertion direction, the guide member 31 abuts on the upper end portion of the small diameter portion 35, and thus the further displacement in the insertion direction is restricted. The outside diameter of the divided piece 71 is formed to be slightly smaller than the inside diameter of the large diameter portion 34.

The tire vulcanizer 1 of this embodiment has the above-described configuration. Next, a maintenance method of the support structure 13 of the tire vulcanizer 1, specifically, a process related to the detachment of the lower platen 14, the heat insulating material 15, and the piston portion 18 which occurs when the sealing member 23 of the piston portion 18 is exchanged will be described with reference to the drawings.

Figure 6:
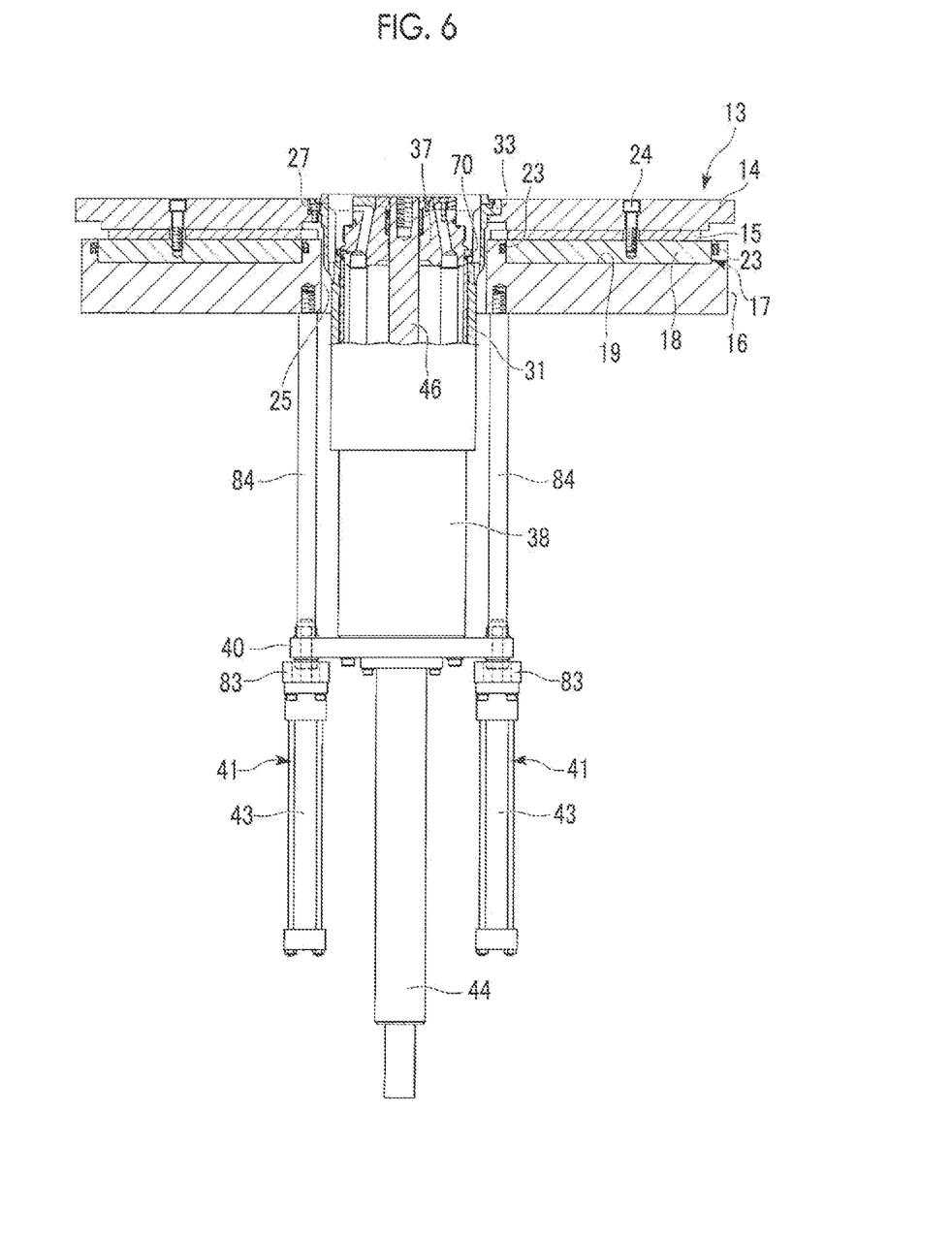
FIG. 6 is a partial cross-sectional view illustrating a state where a bladder is detached from the center mechanism of the tire vulcanizer.

As illustrated in FIG. 6, first, members such as the bladder 50 are in a state of being detached from the bag head 37.

Figure 7:
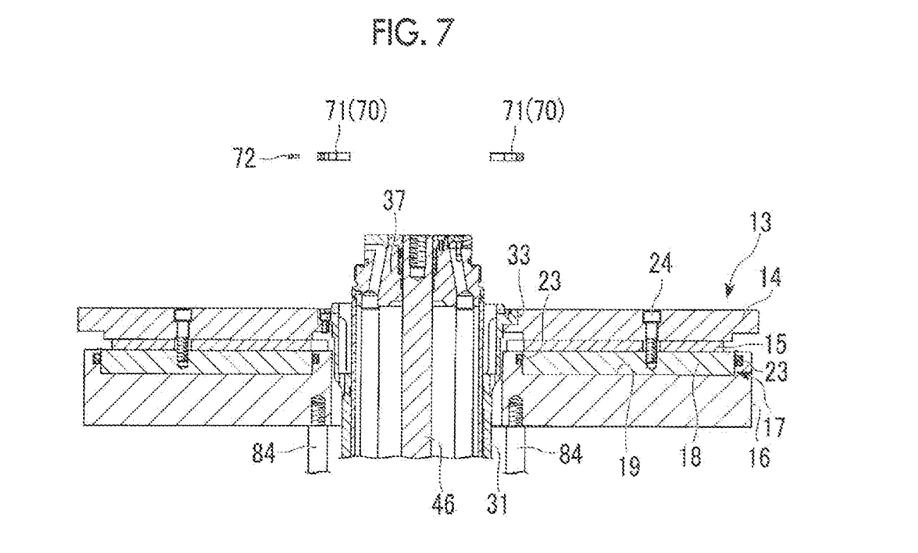
FIG. 7 as a partial cross-sectional view illustrating a state where a bag head of the tire vulcanizer is caused to protrude upward.

Subsequently, as illustrated in FIG. 7, as a protruding process of causing the bag head 37 to protrude, the bag head 37 is caused to protrude and stop by driving the bead lift cylinder 41 so that the restriction member 70 is positioned to be higher than the upper surface of the lower platen 14 in the height direction. Moreover, as a restriction releasing process, the restriction member 70 is separated from the bag head 37 by removing the bolt 72. Accordingly, the relative displacement of the bag head 37 in the insertion direction with respect to the guide member 31 is possible.

Figure 8:
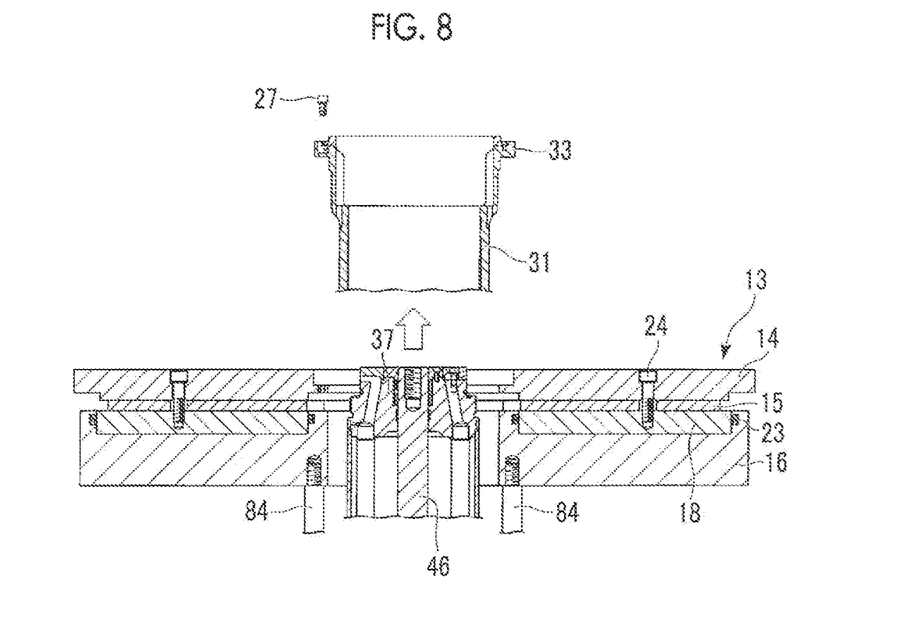
FIG. 8 is a partial cross-sectional view illustrating a state where the guide member of the tire vulcanizer is extracted in an upward direction.

Subsequently, as illustrated in FIG. 8, as a guide disassembly process, the bolt 27 which fixes the flanged portion 33 of the guide member 31 to the lower platen 14 is removed, and the guide member 31 is caused to slide upward to be detached from the bag head 37. Here, in order to cause the guide member 31 to slide upward, the flanged portion 33 of the guide member 31 may be gripped and raised. However, for example, a locked portion (not illustrated) may be formed in the upper surface of the flanged portion 33 in advance. The locked portion is locked into a locking portion which is mounted on the tip end or the like of a crane and is raised, and thus the guide member 31 can be more easily detached from the bag head 37.

Figure 9:
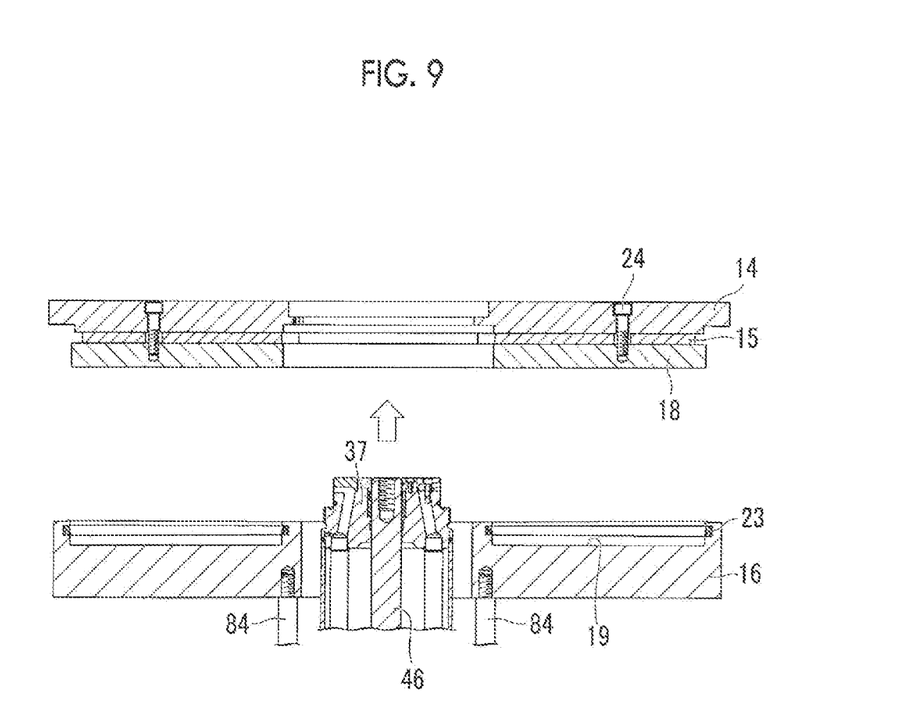
FIG. 9 is a partial cross-sectional view illustrating a state where a lower platen, a heat insulating material, and a piston of the tire vulcanizer are integrally detached.

Furthermore, as illustrated in FIG. 9, as a platen disassembly process, an assembly in which the lower platen 14, the heat insulating material 15, and the piston portion 18 are integrated by the bolts 24 is raised is be separated from the bottom plate portion 16 similarly to the guide member 31. Accordingly, the sealing member 23 of the pressing mechanism 17 can be accessed, and an operation such as exchanging the sealing member 23 is possible.

Here, similarly to the flanged portion 33 of the guide member 31, for example, a locked portion may be formed in the upper surface of the lower platen 14 in advance. In this manner, the assembly in which the lower platen 14, the heat insulating material 15, and the piston portion 18 are integrated by the bolts 24 can be easily detached. When the piston portion 18 is raised, the piston portion 18 is raised by supplying a fluid to the cylinder chamber which is formed by the groove portion 19 and the piston portion 18, and thus the piston portion 18 can be more easily separated from the groove portion 19.

Assembling the support structure 13 and the center mechanism 30 after finishing the maintenance may be performed in the reverse order to the above-described processes.

According to the tire vulcanizer 1 of the embodiment, since the bag head 37 is caused to protrude outward and the restriction member 70 is detached from the outer peripheral surface of the bag head 37, the displacement, that is, relative movement of the bag head 37 with respect to the guide member 31 in the insertion direction is possible without limitations. In addition, since the support structure 13 is detached from the flanged portion 33, the guide member 31 can be moved upward relative to the bag head 37 and the support structure 13, and thus the guide member 31 can be detached alone. As a result, the maintenance of the support structure 13 which is disposed in the periphery of the center mechanism 30 can be easily performed, and thus burden on the worker can be reduced.

Since the restriction member 70 is formed in an annular shape which extends over the entire periphery of the bag head 37, in a case where the restriction member 70 abuts on the guide member 31, a load is not concentrated on a single point but can be distributed over the entire periphery. As a result, the restriction member 70 or the bag head 37 can be prevented from being deformed or damaged.

Moreover, since the restriction member 70 is disposed in the annular groove 73 of the bag head 37, even when a force is applied to the restriction member 70 in the axial direction, the restriction member 70 is supported by the annular groove 73 in the axial direction. Therefore, most of the force in the axial direction is applied to the restriction member 70, and thus a force in a shear direction is suppressed from being directly applied to the belt 72 for fixing the restriction member 70. As a result, the bolt 72 is prevented from being damaged, thereby achieving the improvement in reliability.

Moreover, since the restriction member 70 is formed to be divided in the circumferential direction of the bag head 37, the divided piece 71 can be attached and detached in the radial direction, and thus the attaching and detaching operations can be easily performed.

In a case where the support structure 13 has the pressing mechanism 17 and maintenance frequency tends to increase, since the support structure 13 can be easily detached, time for completing the maintenance can be reduced, and thus operating hours per year of the apparatus can be increased.

In addition, without being limited to the pressing mechanism 17, components disposed below the lower platen 14 of the support structure 13 can be easily accessed. Therefore, burden on the worker due to the maintenance operation of the support structure 13 can be reduced.

The present invention is not limited to the configuration of the above-described embodiment, and the design thereof can be changed without departing from the gist of the present invention.

Figure 10:
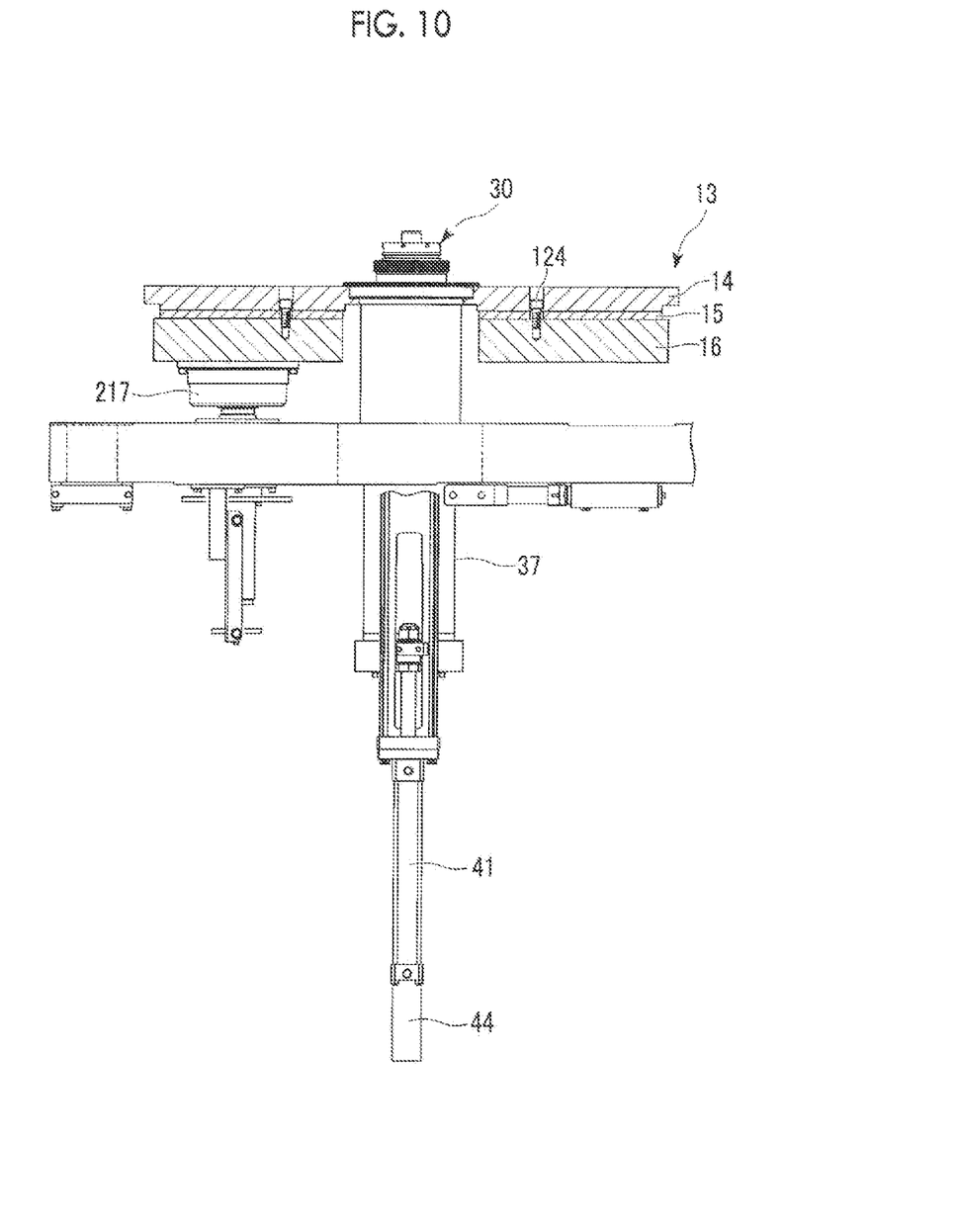
FIG. 10 is a view of a center mechanism of a tire vulcanizer according to a modified example of the embodiment corresponding to FIG. 1.

For example, in the above-described embodiment, the case where the pressing mechanism 17 is embedded in the bottom plate portion 16 of the support structure 13 is described. However, a mechanism which elevates the lower platen 14 is not limited to the pressing mechanism 17 embedded in the bottom plate portion 16. For example, as illustrated in FIG. 10, a hydraulic cylinder 217 or the like which supports the lower side of the bottom plate portion 16 and can elevate the components from the lower platen 14 to the bottom plate portion 16 at the same time may be provided. In this case, it is preferable that the lower platen 14, the heat insulating material 15, and the bottom plate portion 16 be integrated by bolts 124. Accordingly, by detaching the guide member 31 in the same order as the above-described embodiment, the lower platen 14, the heat insulating material 15, and the bottom plate portion 16 can be integrally detached without detaching the entire center mechanism. Therefore, the hydraulic cylinder 217 can be easily accessed.

In the above-described embodiment, the case where the annular groove 73 is formed in the outer periphery of the bag head 37 is described. However, in a case where the strength of the bolt 72 is sufficiently ensured, the annular groove 73 may be omitted.

In the above-described embodiment, the case where the restriction member 70 is divided in the circumferential direction is described. However, the restriction member 70 may be formed in an annular shape in which a female screw portion is formed on the inner peripheral side thereof and a male screw portion may be formed on the outer peripheral surface of the bag head 37 so that the restriction member 70 is screwed and attached to the bag head 37.

In the above-described embodiment, the case where the support structure 13 includes the pressing mechanism 17 and maintenance of the pressing mechanism 17 is performed is exemplified. However, a tire vulcanizer which does not include the pressing mechanism 17 may also be applied. In this case, when maintenance of the support structure 13 is performed, the support structure 13 may be disassembled in the above-described order, and thus the maintenance of the support structure 13 can be easily performed.

Furthermore, in the above-described embodiment, the example in which the restriction member 70 is formed in an annular shape which extends over the entire periphery of the guide member 31 is described. However, in a case where strength sufficient to restrict the displacement of the bag head 37 in the insertion direction can be obtained, a plurality of restriction members may be provided to be separated in the circumferential direction at the same position in the height direction (in other words, the axial direction).

INDUSTRIAL APPLICABILITY

The present invention relates to a tire vulcanizer which performs a vulcanization process of a tire in a high-pressure and high-temperature state, and a maintenance method of the vulcanizer. According to the tire vulcanizer and the maintenance method of the vulcanizer of the present invention, maintenance of a support structure disposed in the periphery of a center mechanism can be easily performed, and thus burden on a worker can be reduced.

REFERENCE SIGNS LIST 11 lower mold (mold)
13 support structure
14 lower platen (platen portion)
16 bottom plate (plate portion)
17 pressing mechanism
25 through-hole
31 guide member
33 flanged portion
37 bag head
70 restriction member
73 annular groove (groove)
71 inside portion (inner peripheral portion)

The invention claimed is:

1. A tire vulcanizer comprising:
a support structure which supports a mold for vulcanization and molding and includes a platen portion provided with a through-hole that communicates with an inner portion of the mold;
a guide member which includes a flanged portion in an end portion thereof so as to cause the flanged portion to be detachably supported by a peripheral edge portion of the through-hole; and
a bag head which is slidably inserted into the guide member,
wherein the bag head includes a restriction member which abuts on the guide member and restricts displacement of the bag head in an insertion direction in a case where the bag head is inserted to a predetermined position set in advance with respect to the guide member,
the restriction member protrudes outward from an outer peripheral surface of the bag head and is detachably mounted on the outer peripheral surface,
the guide member becomes movable relative to the bag head when the restriction member is detached from the outer peripheral surface of the bag head, and
when the guide member is moved upward relative to the bag head and the support structure is detached from the flanged portion, the guide member is capable of being detached from the bag head.

2. The tire vulcanizer according to claim 1, wherein the restriction member is formed in an annular shape which extends over an entire periphery of the guide member.

3. The tire vulcanizer according to claim 2, wherein a groove is formed in the bag head in a circumferential direction, and
the restriction member is formed to be divided in the circumferential direction of the bag head, and an inner peripheral portion of the restriction member is disposed in the groove.

4. The tire vulcanizer according to claim 1, wherein the support structure includes a plate portion which supports the platen portion, and the plate portion includes a pressing mechanism which is able to press platen portion.

5. A maintenance method of the tire vulcanizer according to claim 1, comprising:
a protruding process of causing the bag head to protrude from the guide member;
a restriction releasing process of detaching the restriction member from the bag head;
a guide disassembly process of detaching the flanged portion of the guide member from the support structure, and separating the guide member from the bag head by causing the guide member to slide toward an end portion of the bag head; and
a platen disassembly process of detaching the platen portion.

* * * * *